No. 888,561. PATENTED MAY 26, 1908.
E. E. WHITEHEAD.
WIRE FENCE STRETCHER.
APPLICATION FILED OCT. 19, 1907.
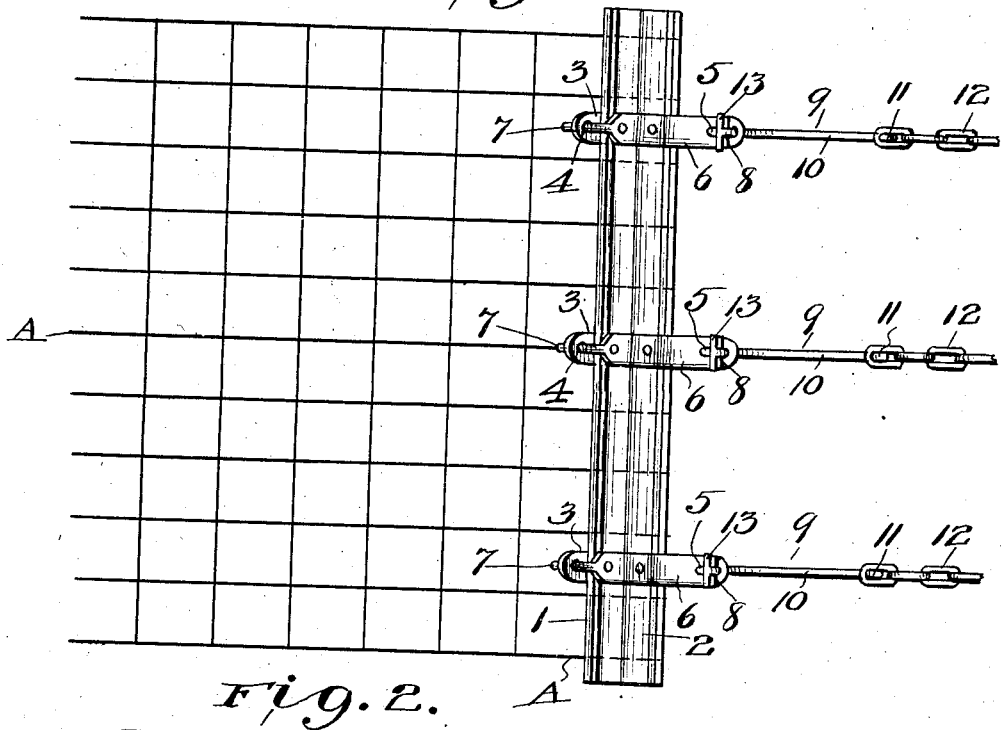
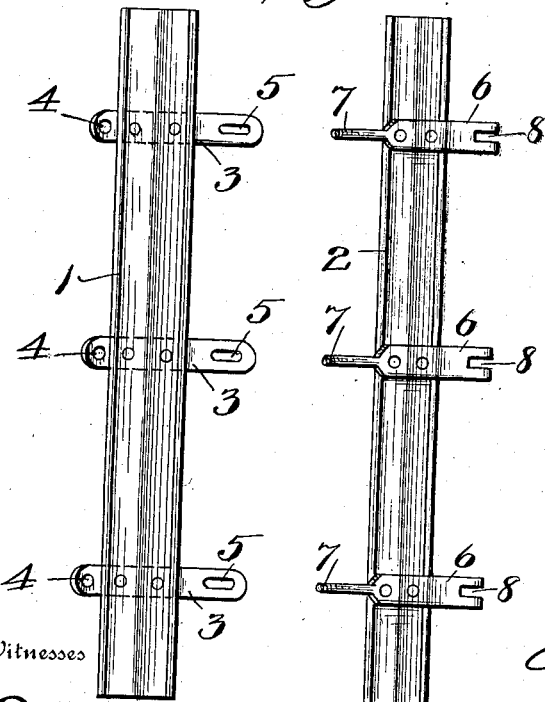
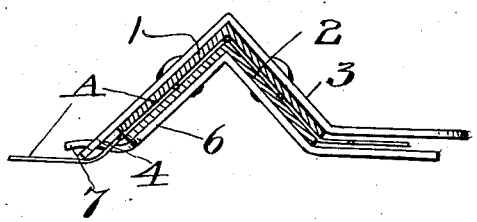
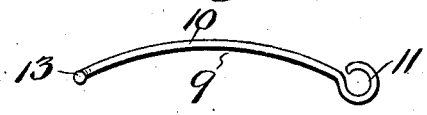
Witnesses
Inventor
Edward E. Whitehead
By D. A. Gourick
Attorney

UNITED STATES PATENT OFFICE.

EDWARD E. WHITEHEAD, OF GOSHEN, INDIANA.

WIRE-FENCE STRETCHER.

No. 888,561.

Specification of Letters Patent.

Patented May 26, 1908.

Application filed October 19, 1907. Serial No. 398,229.

*To all whom it may concern:*

Be it known that I, EDWARD E. WHITEHEAD, a citizen of the United States, residing at Goshen, in the county of Elkhart and State of Indiana, have invented certain new and useful Improvements in Wire-Fence Stretchers, of which the following is a specification.

My invention relates to devices for stretching wire fence fabrics or a plurality of line wires simultaneuosly and has for its object the provision of a clamp capable of being quickly adjusted and connected with the wires or fabric and as readily dismembered for removal after stretching.

My invention will be described in detail hereinafter and will be found illustrated in the accompanying drawings in which—

Figure 1 is a side view of my invention showing it applied to a fence fabric, Fig. 2, a view showing the bars separated, Fig. 3, a cross section of the clamp in a clamping position, and Fig. 4, a view of one of the straining hooks.

In the drawings similar reference characters indicate corresponding parts throughout the several views.

The clamping bars 1 and 2 of my improved stretcher are made angle-shaped in cross section so that when in a clamping position the wires A are crimped between them and held securely. 3 indicates straps secured to bar 1 and transversely thereof and having their ends projecting from each edge of the bar with a hole 4 in one of their ends and a slot 5 in the other. The bar 2 has straps 6 secured thereto in the same relative positions as straps 3 are secured to bar 1, said straps 6 having hooks 7 projecting from one of their ends and open slots or notches 8 in their other ends.

In adjusting the clampimg bars to the fence the bars are separated as shown in Fig. 2, and the hooks 7 then inserted in the holes 4. 9 indicates straining hooks consisting of curved shanks 10 having a hook 11 at one end to receive a link of a chain 12 or other straining device and a cross-bar 13 at the other end. In securing the straining hooks 9 in position the cross bars 13 are inserted through the slots 5 in straps 3 and then into the open slots or notches 8. When a strain is exerted on hooks 9 it will be understood that the bars 1 and 2 will be drawn together and the wires A crimped and tightly clamped between them.

Having thus described my invention what I claim is—

1. In a wire fence stretcher, clamping bars, straps secured to one bar having holes therein, straps secured to the other bar having hooks thereon, and straining members having curved shanks, a hook on one end of the shank and a cross bar on the other, and the free ends of said straps formed to receive said cross-bar and shank, substantially as shown and described.

2. In a wire fence stretcher, clamping bars angle-shaped in cross-section, straps secured to one bar having a hole in one end of each and a slot in the other end, straps secured to the other bar having hooks on one end and notches in the other, said hooks to engage the holes aforesaid to loosely hinge the bars together, and straining members having curved shanks, a hook on one end of the shank and a cross bar on the other to engage the slots and notches aforesaid, substantially as shown and described.

In testimony whereof I hereto affix my signature in the presence of two witnesses.

EDWARD E. WHITEHEAD.

Witnesses:
 CHARLEY EVANS,
 DANIEL BAINTER.